United States Patent
Hailpern et al.

(10) Patent No.: US 10,812,508 B2
(45) Date of Patent: Oct. 20, 2020

(54) PERFORMANCE TRACKING IN A SECURITY INFORMATION SHARING PLATFORM

(71) Applicant: ENTIT Software LLC, Sunnyvale, CA (US)

(72) Inventors: Joshua Hailpern, Sunnyvale, CA (US); Tomas Sander, Princeton, NJ (US)

(73) Assignee: Micro Focus, LLC, Santa Clara, CA (US)

( * ) Notice: Subject to any disclaimer, the term of this patent is extended or adjusted under 35 U.S.C. 154(b) by 193 days.

(21) Appl. No.: 15/765,944

(22) PCT Filed: Oct. 9, 2015

(86) PCT No.: PCT/US2015/054961
§ 371 (c)(1),
(2) Date: Apr. 4, 2018

(87) PCT Pub. No.: WO2017/062037
PCT Pub. Date: Apr. 13, 2017

(65) Prior Publication Data
US 2018/0288085 A1    Oct. 4, 2018

(51) Int. Cl.
*H04L 29/06* (2006.01)
*G06F 21/34* (2013.01)
(Continued)

(52) U.S. Cl.
CPC ...... *H04L 63/1425* (2013.01); *G06F 11/3006* (2013.01); *G06F 11/3438* (2013.01);
(Continued)

(58) Field of Classification Search
CPC .......... G06F 11/3438; G06Q 10/06393; G06Q 50/01
See application file for complete search history.

(56) References Cited

U.S. PATENT DOCUMENTS 8,504,486 B1 * 8/2013 Pinto ................. G06Q 30/0631 705/1.1
8,631,489 B2    1/2014 Antonakakis et al.
(Continued)

FOREIGN PATENT DOCUMENTS

EP    2738708 A1    6/2014
WO    WO2013147889    10/2013

OTHER PUBLICATIONS

Randall et al., "Giving Credit Where Credit Is Due: Designing Open Badges fora Technology Integration Course", pp. 88-95 (Year: 2013).*

(Continued)

*Primary Examiner* — Thaddeus J Plecha

(57) ABSTRACT

Example implementations relate to performance tracking in a security information sharing platform. For example, the security information sharing platform may enable sharing of security information among a plurality of users. A method of performance tracking in the security information sharing platform may include monitoring user behavior in the security information sharing platform, comparing the user behavior against a plurality of performance objectives in the security information sharing platform, and assigning a badge to a user among the plurality of users, for achievement of a performance objective among the plurality of performance objectives, based on the comparison.

20 Claims, 3 Drawing Sheets

(51) Int. Cl.
*G06F 21/31* (2013.01)
*G06F 21/55* (2013.01)
*G06F 11/30* (2006.01)
*G06F 11/34* (2006.01)
*G06Q 50/00* (2012.01)
*G06Q 10/06* (2012.01)

(52) U.S. Cl.
CPC ............ *G06F 21/316* (2013.01); *G06F 21/34* (2013.01); *G06F 21/552* (2013.01); *G06Q 10/06393* (2013.01); *G06Q 50/01* (2013.01)

(56) References Cited

U.S. PATENT DOCUMENTS

| | | | |
|---|---|---|---|
| 8,667,583 | B2 | 3/2014 | Polyakov et al. |
| 8,813,228 | B2 | 8/2014 | Magee et al. |
| 8,850,588 | B2 | 9/2014 | Jumar et al. |
| 9,009,321 | B2 | 4/2015 | Alperovitch et al. |
| 9,009,827 | B1 | 4/2015 | Albertson et al. |
| 9,015,846 | B2 | 4/2015 | Watters et al. |
| 9,495,062 | B1* | 11/2016 | Reiner .................... H04L 51/32 |
| 2002/0038430 | A1 | 3/2002 | Edwards et al. |
| 2003/0005193 | A1 | 1/2003 | Seroussi et al. |
| 2003/0126470 | A1 | 7/2003 | Crites et al. |
| 2006/0294388 | A1 | 12/2006 | Abraham et al. |
| 2007/0222589 | A1* | 9/2007 | Gorman ................. G06Q 10/00 340/539.26 |
| 2010/0100956 | A1 | 4/2010 | Fusari |
| 2011/0225650 | A1 | 9/2011 | Margolies et al. |
| 2011/0256521 | A1* | 10/2011 | Mansfield ................ G09B 7/00 434/350 |
| 2012/0110633 | A1 | 5/2012 | An et al. |
| 2012/0130863 | A1 | 5/2012 | Tedjamulia et al. |
| 2012/0151569 | A1 | 6/2012 | Farsedakis |
| 2012/0246730 | A1 | 9/2012 | Raad |
| 2013/0086484 | A1 | 4/2013 | Antin et al. |
| 2013/0179679 | A1 | 7/2013 | Broustis et al. |
| 2013/0204664 | A1 | 8/2013 | Romagnolo et al. |
| 2014/0007190 | A1 | 1/2014 | Alperovitch et al. |
| 2014/0201836 | A1 | 7/2014 | Amsler |
| 2014/0212112 | A1* | 7/2014 | Haff ....................... G06F 16/70 386/286 |
| 2014/0304182 | A1 | 10/2014 | Kurien et al. |
| 2015/0046990 | A1 | 2/2015 | Oberheide et al. |
| 2015/0172311 | A1 | 6/2015 | Freedman et al. |
| 2015/0277953 | A1* | 10/2015 | Xu ....................... G06F 9/45558 718/1 |
| 2016/0127899 | A1* | 5/2016 | Jabara .................. H04W 12/06 455/411 |
| 2016/0292375 | A1* | 10/2016 | Gegner .................. G16H 40/63 |
| 2016/0301203 | A1* | 10/2016 | Curry ...................... F24F 11/89 |
| 2016/0305343 | A1* | 10/2016 | Morgan .................... F02C 9/28 |
| 2016/0364126 | A1* | 12/2016 | Li ........................ G06F 3/04847 |
| 2017/0026332 | A1* | 1/2017 | Loa ........................ G06Q 50/01 |
| 2017/0032394 | A1* | 2/2017 | Stevens .............. G06Q 30/0203 |
| 2017/0064020 | A1* | 3/2017 | Obukhov ................ H04L 67/22 |
| 2018/0046502 | A1* | 2/2018 | Zimmer ................ G06F 9/4856 |
| 2018/0205814 | A1* | 7/2018 | Bron .................... H04M 1/7253 |

OTHER PUBLICATIONS

Chismon, D., et al., Threat Intelligence: Collecting, Analysing, Evaluating, Mar. 20, 2015, MWR InfoSecurity, 36 pages.
International Search Report and Written Opinion dated Jul. 1, 2016, PCT Patent Application No. PCT/US2015/054961 dated Oct. 9, 2015, Korean Intellectual Property Office, 10 pages.
Scekic, O,. et al., Incentives and Rewarding in Social Computing, Jun. 2013, Communications of the ACM, vol. 56, No. 6, 11 pages.
Barnum, S., Standardizing Cyber Threat Intelligence Information with the Structured Threat Information eXpression (STIX™), May 30, 2013, The NITRE Corporation, 20 pages total.
International Search Report and Written Opinion dated Jul. 8, 2016, PCT Patent Application No. PCT/US2015/052447 dated Sep. 25, 2015, 13 pages total.
International Search Report and Written Opinion dated Jul. 8, 2016, PCT Patent Application No. PCT/US2015/054989 dated Oct. 9, 2015, 10 pages total.
Microsoft Corporation, Microsoft Advanced Threat Analytics, May 4, 2015, http://www.microsoft.com/en-us/server-cloud/products/advanced-threat-anal, 15 pages total.

* cited by examiner

PERFORMANCE TRACKING IN A SECURITY INFORMATION SHARING PLATFORM

BACKGROUND

Users of a security information sharing platform share security information, such as security indicators, threat actors, malware samples, and attack campaigns, with other users in an effort to advise the other users of any security threats, as well as to gain information related to security threats from other users.

BRIEF DESCRIPTION OF THE DRAWINGS

The flowing detailed description references the drawings, wherein.

DETAILED DESCRIPTION

Figure 1:
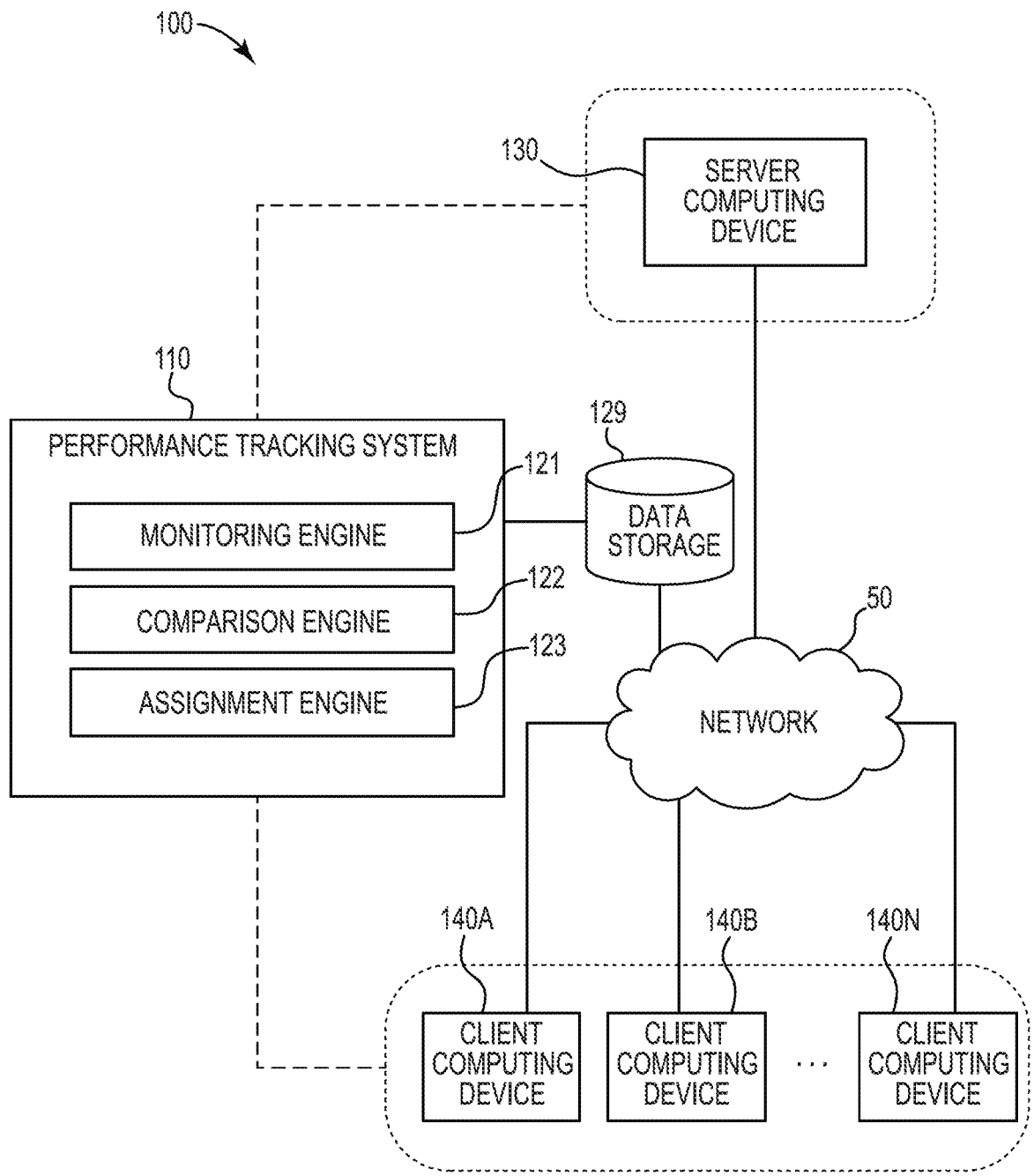
FIG. 1 is a block diagram depicting an example environment in which various examples may be implemented as a performance tracking system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Information to be shared within a security information sharing platform may be created or validated by human security analysts. For example, higher level intelligence, such as descriptions of threat actors' motives, tools, techniques and procedures, and potential targets, may include human analysis to both produce and consume. This type of contextual intelligence may be valuable to a security analyst because it has been validated by another analyst, is related to important security events, and is more comprehensive than lower level intelligence, thus allowing an analyst to better respond to threats.

As some of the most valuable information shared within the security information sharing platform may include human interaction, it may be beneficial for users of the security information sharing platform to not only participate in the platform but to contribute information and data. Additionally, as the security information sharing platform includes information and security threats, a user may want to remain anonymous so that a particular vulnerability cannot be traced back to his or her company. Therefore, it may be beneficial for contributions by a user to remain anonymous.

Users of a security information sharing platform may share security information, such as security indicators, threat actors, malware samples, and attack campaigns, among other types of security information, with other users in an effort to advise other users of any security threats, as well as to gain information related to security threats from other users. The other users with whom the security information is shared may belong to a community that the user selects for sharing, or to the same community as the user. The other users of such communities may further share the security information with other users or communities. A "user," as used herein, may include an individual, organization, or any other entity that may send, receive, or share security information. A community may include a plurality of users. For example, a community may include a plurality of individuals having a common interest. A community may include a global community where any user may join, for example, via subscription. A community may also be a vertical-based community. For example, a vertical-based community may be a healthcare or financial community. A community may also be a private community with a limited number of selected users.

A "security indicator," as used herein, may refer to a detection guidance for a security threat or vulnerability. In other words, the security indicator may specify what to detect or look for, also known as an observable, and what detection of a particular observable means. For example, the security indicator may specify a certain Internet Protocol (IP) address to look for in the network traffic. The security indicator may include information that the detection of the IP address in the network traffic can indicate a certain malicious security threat, such as a Trojan virus. An "observable," as used herein, may refer to an event pertinent to the operation of computers and networks, including an event occurring in networks, servers, applications, and desktops. Examples of an observable may include an IP address, an email address, and a domain name. A security indicator may compromise a single observable or a plurality of observables.

A security indicator may be created by or originated from at least one of a plurality of source entities. For example, the plurality of source entities may include a user, such as an analyst or community member of a security information sharing platform. A security indicator may be manually created and added to the platform by the user. In another example, the plurality of source entities may include a threat intelligence provider that provides threat intelligent feeds. A security indicator that is found in the intelligence feeds may be provided by independent third parties. There exist a number of providers of threat intelligence feeds. The threat intelligence feeds may be provided by independent third parties such as security service providers. The providers or sources may supply the threat intelligence feeds that provide information about threats the providers have identified. Threat intelligence feeds may include, for example, lists of domain names, IP addresses, and URLs that various providers have classified as malicious, or at least suspicious, according to different methods and criteria. Other examples of source entities may include, but are not limited to, government sources and open source feeds.

Users of the security information sharing platform may be recognized for their contribution to the security information sharing platform. For example, users may be assigned a badge or a plurality of badges to acknowledge contributions the user has made. A badge, as used herein, refers to a textual, visual, or other recognizable pattern that distinguishes a user of a security information sharing platform. Badges may be associated with unique user attributes, such as expertise, seniority, and contributions. These attributes may be thought of as fine-grained properties associated with a user, such as personal achievement within the security information sharing platform, identification of particular security threats, among other examples discussed further herein. Since badges measure fine-grained properties, they may convey information that is different than the information conveyed by a reputation score.

Badges may be awarded for a variety of security outcomes. A security outcome, as used herein, refers to a defined goal within the security information sharing platform, which may be defined by the security information sharing platform itself, an employer, and/or an organization, among others. Examples of a security outcome may include performance objectives, such as personal achievements, benchmarks, and/or competitions; types of performance, such as an impact of the users' contribution in the security information sharing platform, a number of issues verified by other users, and/or seniority of a particular user. Similarly, a security outcome may include actions completed by a user, such as identification of an issue, responses to queries, and/or contributions. Badges may further be awarded to organizations participating in a security information sharing platforms or may incorporate feedback from other platform participants, as discussed further herein.

The badges and other information related to a user may be associated with a profile. A "profile," as used herein may include a collection of information about a corresponding user and/or the accomplishments and contributions of the user within the security information sharing platform. The profile may include profile elements. A "profile element," as used herein may include units of information about the user. The profile and the profile elements may include information that is designed to communicate characteristics of the user and user contributions in an anonymous manner. That is, the profile and profile elements may include information that is descriptive of characteristics of the user and/or the user's contributions without being intentionally descriptive of an identity (e.g., name, employer, corporate identity, location, etc.) of the user. The profile elements may be individual units of information such as a badge. Alternatively, the profile elements may be a set of information such as a set of badges.

Examples of the current disclosure include examples that track performance of users within a security information sharing platform. Examples of the current disclosure simultaneously preserve a gamification system that recognizes contributions made by the users of the platform, while maintaining privacy, or in other words, anonymity, of the users so as to encourage user contribution to the platform. Examples included herein include monitoring user behavior in the security information sharing platform, comparing the user behavior against a plurality of performance objectives, and assigning a badge to a user for achievement of a performance objective.

The terminology used herein is for the purpose of describing particular embodiments only and is not intended to be limit. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening element, unless otherwise indicated. Two elements can be coupled mechanically, electrically, or communicatively linked through a communication channel, pathway, network, or system. It will also be understood that, although the terms first, second, third, etc. may be used herein to describe various elements, these elements should not be limited by these terms, as these terms are only used to distinguish one element from another unless stated other or the context indicates otherwise. As used herein, the term "includes" means includes but not limited to, and the term "including" means including but not limited to. The term "based on" means based at least in part on.

FIG. 1 is an example environment 100 in which various examples may be implemented as a performance tracking system 110. Performance tracking system 110 may include a server computing device in communication with client computing devices 140A, 140B, . . . 140N (referred to collectively as client computing devices 140) via a network 50. The client computing devices 140 may communicate requests to and/or receive responses from the server computing device 130. The server computing device 130 may receive and/or respond to requests from the client computing devices 140. The client computing devices 140 may be any type of computing device providing a user interface through which a user can interact with a software application. For example, the client computing devices 140 may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface. While the server computing device 130 can be a single computing device, the server computing device 130 may include any number of integrated or distributed computing devices.

The various components (e.g., components 129, 130, and 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, performance tracking system 110 and the various components described herein may be implemented in hardware and/or a combination of hardware and programming that configures hardware. Furthermore, in FIG. 1 and other Figures described herein, different numbers of components or entities than depicted may be used.

Performance tracking system 110 may comprise a monitoring engine 121, a comparison engine 122, an assignment engine 123, and/or other engines. The term "engine", as used herein, refers to a combination of hardware and programming that performs a designated function. As is illustrated with respect to FIG. 2, the hardware of each engine, for example, may include one or both of a processor and a machine-readable storage medium, while the programming is instructions or code stored on the machine-readable storage medium and executable by the processor to perform the designated function.

Monitoring engine 121 may monitor anonymous user indicators in a security information sharing platform that enables sharing of security information among a plurality of users. Put another way, the monitoring engine 121 may track, in the security information sharing platform, contributions or information shared within a security information sharing platform. As discussed above, the security information sharing platform may enable sharing of security information (e.g., security indicators, observables, threat actors, malware samples, chains of attack, attack campaigns, etc.) among a plurality of users or a plurality of communities. For example, a particular security indicator may be associated with a separate data record such as an observable, another security indicator, a threat actor, a malware (e.g., or sample thereof), a chain of attack, an organization, an industry sector, a community, a domain name, an indicator score for the particular security indicator, a source entity, a level of confidence (e.g., the level of confidence that the indicator is actually malicious), a level of severity or potential blocking impact (e.g., the level of severity or potential blocking impact that the indicator may pose), and/or a sighting of an observable of the particular security indicator.

Such monitoring of contributions or information shared within the security information sharing platform may occur in various ways. In some examples, monitoring engine 121 may monitor the contributions made or information shared by a single user. For example, when a user submits a particular type of security indicator to the platform, monitoring engine 121 may note that the user has submitted a security indicator to the platform. Monitoring engine 121 may further note the particular type of security indicator, e.g., malware, chain of attack, or attack campaign. In addition, monitoring engine 121 may note the overall number of contributions made by the user to the platform.

In some examples, monitoring engine 121 may monitor actions of a user in resolving identified security threats. For example, a user may submit an instance of a particular type of security indicator to the platform. After receiving feedback from other users of the platform, the user may be able to resolve or otherwise negate the threat posed by the security indicator. Monitoring engine 121 may note that the user had identified a security threat when the original contribution was made. Monitoring engine 121 may further note that the user had resolved or negated the threat posed by the security indicator.

In some examples, monitoring engine 121 may monitor interactions between a user of the platform and a plurality of other users of the platform. For example, a user may make a contribution to the platform regarding a particular security indicator; other users may then comment on the original contribution to, for example, verify the indicator as a true threat or offer solutions. Monitoring engine 121 may note that the user received feedback regarding the original contribution. Furthermore, the user may also comment on contributions made by other users of the platform. Monitoring engine 121 may thus also note that the user is providing feedback to other users of the platform.

In some examples, monitoring engine 121 may monitor the actions and contributions of a cohort of users of the security information sharing platform. A cohort, as used herein, may refer to a plurality of users of the platform. For example, a cohort may collaborate to resolve a particular security threat posed by a security indicator. A cohort may include a plurality of users from a same organization, although a cohort may also include a plurality of users from a plurality of organizations. Monitoring engine 121 may note that a plurality of users were involved in resolving the security threat, such as a cohort. Monitoring engine 121 may further note attributes of the plurality of users, such as the type of organization or sector of industry that an individual user is associated with.

Comparison engine 122 may compare the anonymous user indicators against a plurality of performance objectives in the security information sharing platform Put another way, the comparison engine 122 may compare the information gathered and noted by monitoring engine 121 to requirements for a particular badge. As used herein, a performance objective refers to a goal within the security information sharing platform that defines some level of performance of a user and/or a plurality of users. A performance objective may be determined by an administrator of the security information sharing platform. A performance objective may also be determined by an organization participating in the security information sharing platform. A performance objective may further be stored within the storage medium of the security information sharing platform. An example of a performance objective may include a personal achievement goal, such as a user achieving a personal record number of actions taken in a period of time. Another example of a performance objective may include a benchmark established by the security information sharing platform and/or by an employer of the user. For instance, a benchmark may refer to a specified number of cases that the user closes within a defined period of time, such as a fiscal quarter. In yet another example, a performance objective may be a competition within the security information sharing platform. For instance, the security information sharing platform may determine a user that has the greatest number of closed cases within a particular company, within an industry sector, and/or other group or community in the security information sharing platform.

In some examples, monitoring engine 121 may note that a user has contributed information about a particular security indicator to the platform. Comparison engine 122 may then use the information gathered by monitoring engine 121, such as the type of contribution made, type of security indicator located, or overall number of contributions made, to determine whether the requirements for a particular badge are met.

Assignment engine 123 may assign a badge to a user among the plurality of users, for achievement by the user of a performance objective among the plurality of performance objectives. Put another way, the assignment engine 123 may assign a badge to a user if comparison engine 122 determines that the user has met the requirements for the badge. In some examples, assignment engine 123 may assign the badge to a user immediately upon a determination by comparison engine 122 that the user has met the requirements. For example, the assignment engine 123 may assign a badge to the user in response to the user sharing information about an identified malware issue in the security information sharing platform, if the requirement for achievement of that badge was that the user identify a malware issue. Examples are not so limited, however, and the user may be awarded a badge for other actions and/or achievement of other performance objectives, as described herein.

In some examples, assignment engine 123 may delay assignment of the badge to the user until a predetermined condition, such as total number of users able to receive the badge, has been satisfied.

In some examples, a badge may be assigned to a cohort of users. For example, if a cohort of users meets the requirements for a badge, assignment engine 123 may assign the badge to the plurality of users within the cohort or to the cohort as a whole.

In some examples, performance tracking system 110 may comprise a tag engine (not illustrated in FIG. 1) to tag subsequent anonymous indicators shared by the user in the security information sharing platform, with the assigned badge. For example, as the user participates in the security information sharing platform, the users' contributions to the platform may be tagged with the badge which the user has earned. As used herein, to "tag" refers to adding a visual representation indicating the association of the particular badge to the particular user.

Also, in some examples, the performance tracking system 110 may comprise a profile engine (not illustrated in FIG. 1) to maintain a user profile for each respective user among the plurality of users. In such examples, the profile engine may add the assigned badge to a user profile associated with the user, once the user has been assigned the badge. Similarly, if the badge is assigned to a plurality of users, such as a cohort of users, an entire organization, etc., then the profile engine may identify an organization and/or group to which each user belongs, and assign the badge to each user within the organization to which the badge has been assigned.

In performing their respective functions, engines 121-123 may access data storage 129 and/or other suitable database(s). Data storage 129 may represent any memory accessible to performance tracking system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Performance tracking system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
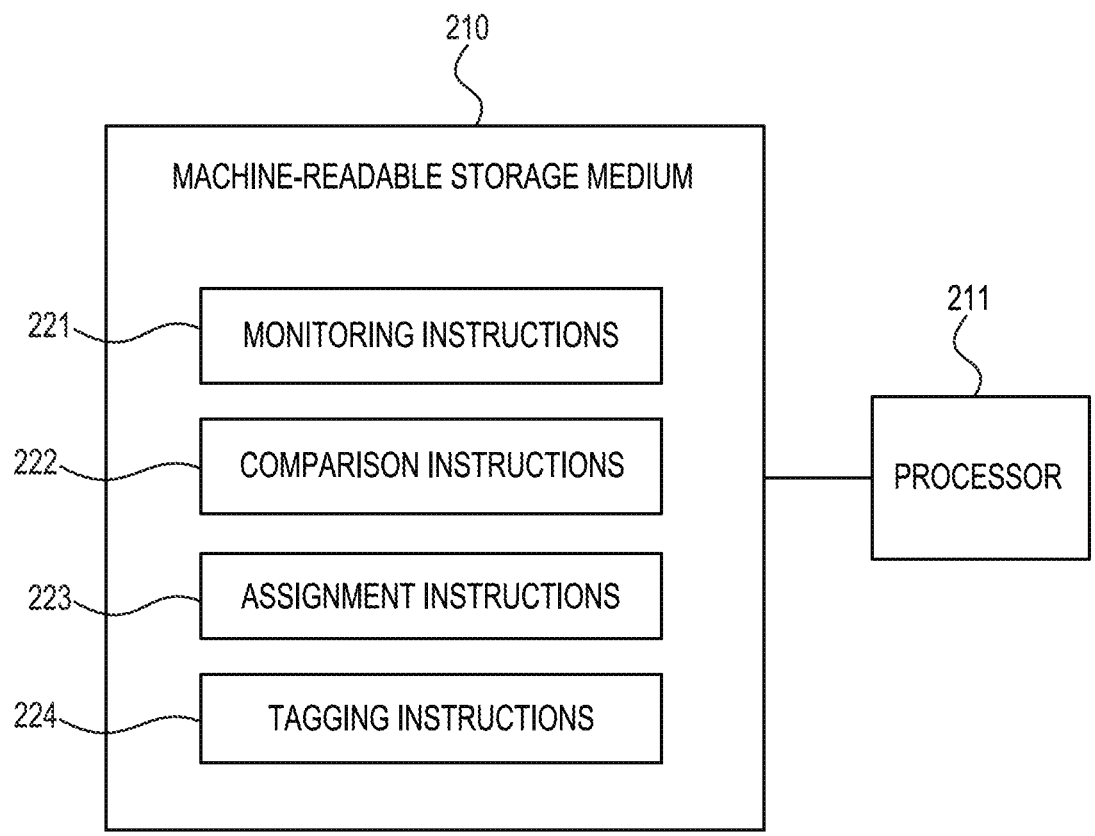
FIG. 2 is a block diagram depicting an example machine-readable storage medium comprising instruction executable by a processor for performance tracking in a security information sharing platform.

FIG. 2 is a block diagram depicting an example machine-readable storage medium 210 comprising instructions executable by a processor 211 tracking performance in a security information sharing platform.

In the foregoing discussion, engines 121-123 were described as combinations of hardware and programming. Engines 121-123 may be implemented in a number of fashions. Referring to FIG. 2, the programming may be processor executable instructions 221-224 stored on a machine-readable storage medium 210 and the hardware may include a processor 211 for executing those instructions. Thus, machine-readable storage medium 210 may be said to store program instructions or code that, when executed by processor 211, implements performance tracking system 110 of FIG. 1.

In FIG. 2, the executable program instructions in machine-readable storage medium 210 are depicted as monitoring instructions 221, comparison instructions 222, assignment instructions 223, and tagging instructions 224.

Instructions 221-223 represent program instructions that, when executed, cause processor 211 to implement engines 221-223, respectively. That is, the monitoring instructions 221, when executed, cause processor 211 to monitor user behavior in a security information sharing platform that enables sharing of security information among a plurality of users. Similarly, the comparison instructions 222, when executed, cause processor 211 to measure security related outcomes in the security information sharing platform by comparing the user behavior against a plurality of performance objectives. Put another way, the processor may determine whether particular security related outcomes have been achieved. As used herein, a security related outcome refers to a performance objective and/or an action completed by the user.

The assignment instructions 223, when executed, cause processor 211 to assign a badge to a user among the plurality of users in response to determining that the user achieved a particular security related outcome. Similarly, the tagging instructions 224, when executed, cause processor 211 to tag contributions in the security information sharing platform from the user with the assigned badge. Put another way, the tagging instructions 224 may allow subsequent contributions of a user with an assigned badge to be labeled with an indication that the user has a particular badge. For example, a user may earn a badge for identifying a number of credible security threats related to a particular type of security indicator. Subsequent contributions relating to the same type of security indicator may be tagged with the badge indicating that the user has previously identified such security indicators.

In some examples, the machine-readable storage medium 210 may include instructions to combine a set of badges awarded to a user and generate a certificate for the user including the combined badges, where the certificate identifies a level of achievement of the user in addressing security events in the security information sharing platform. For example, the badges can be combined to award certificates and/or certifications of performance. Users can use these certifications, for example, when they apply for a new job. Badges may be used by a user to tag the user's contributions, so that other participants know how much they can trust the user without knowing who the user is. For example, if a response to a malware query is tagged with originating from a user with a "Malware Expert" badge, the recipient of the response may trust the recommendation without knowing who the recommending user is. Similarly, badges combined into certifications may signify a level of experience or reputation of the user. Examples for certificates may include, "Hunt Team Level 1", identifying that a number of non-alert based threats, over a particular time period, was identified by the team, and a number of other companies benefited from the identification of the non-alert based threats. Another example of a certificate may include, "Quick Responder 3", identifying that the user or plurality of users classified a number of actions within a specified response time, such as 30 minutes, over a specified period of time, such as 6 months. Yet another example of a certificate may include "security information sharing platform High Performer", indicating that the user or plurality of users had a number of contributions to the security information sharing platform resulting in a rank are in a particular percentile of the security information sharing platform users, such as the top 30%. Other examples of certificates may include, "security information sharing platform master", indicating that the user or plurality of users have contributed to the platform over a period of time with at least a threshold number of contributions that have been positively ranked by other users, and "Malware Expert", indicating that the user or plurality of users have helped to resolve a threshold number of malware cases. Examples are not so limited, however, and other examples of certificates may be provided.

Machine-readable storage medium 210 may be any electronic, magnetic, optical, or other physical storage device that contains or stores executable instructions. In some implementations, machine-readable storage medium 210 may be a non-transitory storage medium, where the term "non-transitory" does not encompass transitory propagating signals. Machine-readable storage medium 210 may be implemented in a single device or distributed across devices. Likewise, processor 211 may represent any number of processors capable of executing instructions stored by machine-readable storage medium 210. Processor 211 may be integrated in a single device or distributed across devices. Further, machine-readable storage medium 210 may be fully or partially integrated in the same device as processor 211, or it may be separate but accessible to that device and processor 211.

In one example, the program instructions may be part of an installation package that when installed can be executed by processor 211 to implement performance tracking system 110. In this case, machine-readable storage medium 210 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 210 may include a hard disk, optical disk, tapes, solid state drives, RAM, ROM, EEPROM, or the like.

Processor 211 may be at least one central processing unit (CPU), microprocessor, and/or other hardware device suitable for retrieval and execution of instructions stored in machine-readable storage medium 210. Processor 211 may fetch, decode, and execute program instructions 221-224, or other instructions. As an alternative or in addition to retrieving and executing instructions, processor 211 may include at least one electronic circuit comprising a number of electronic components for performing the functionality of at least one of instructions 221-224, or other instructions.

Figure 3:
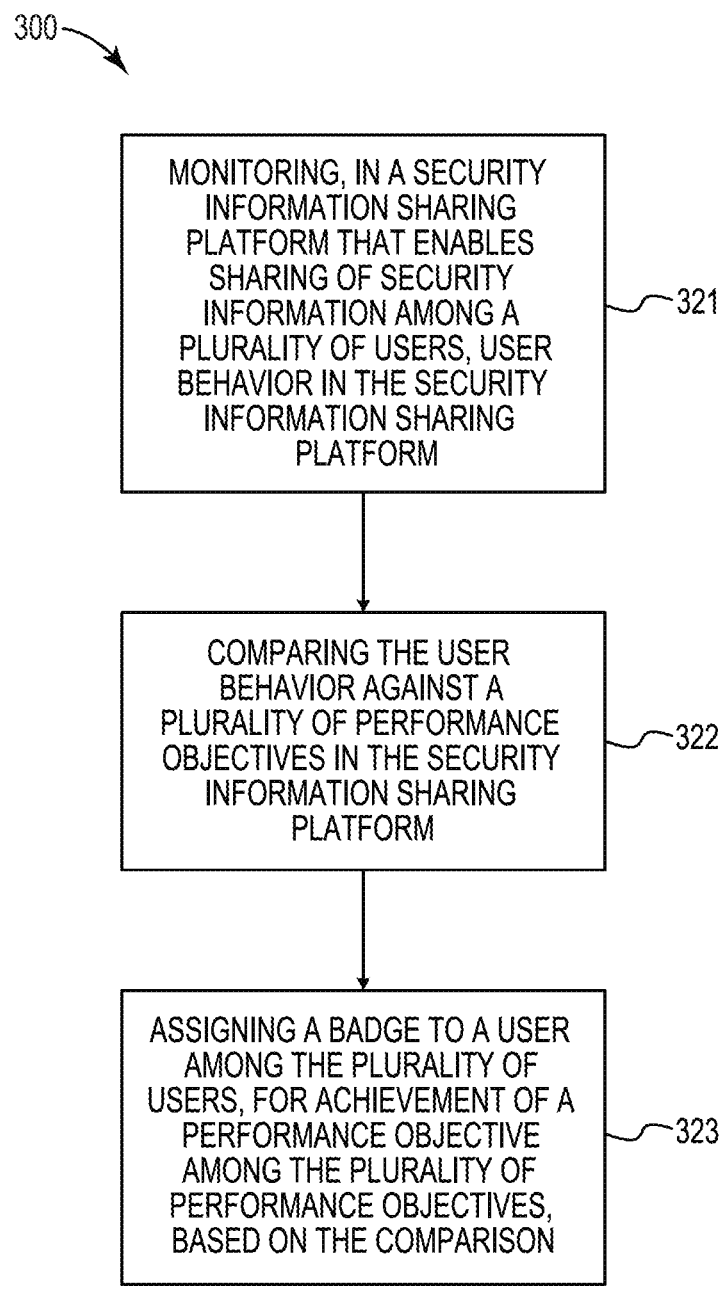
FIG. 3 is a flow diagram depicting an example method for performance tracking in a security information sharing platform.

FIG. 3 is a flow diagram depicting an example method 300 for monitoring performance in a security information sharing platform. The various processing blocks and/or data flows depicted in FIG. 3 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 300 as illustrated (and described in greater detail below) is meant to be an example and, as such, should not be viewed as limiting. Method 300 may be implemented in the form of executable instructions stored on a machine-readable storage medium, such as storage medium 210, and/or in the form of electronic circuitry.

In block 321, method 300 may include monitoring, in a security information sharing platform that enables sharing of information among a plurality of users, user behavior in the security information sharing platform. Referring back to FIG. 1, monitoring engine 121 may be responsible for implementing block 321.

In block 322, method 300 may include comparing the user behavior against a plurality of performance objectives in the security information sharing platform. Referring back to FIG. 1, search engine 122 may be responsible for implementing block 322. As described herein, comparing the user behavior against the plurality of performance objectives may include determining that the user behavior exceeds a threshold associated with the performance objective, as described herein. In some examples, comparing the user behavior against the plurality of performance objectives may include measuring feedback from a plurality of other users in the security information sharing platform. For instance, the user's contributions in the security information sharing platform may be compared against a number of positive votes from other users regarding the contributions of the user. Similarly, other users may rate the contributions of the user, indicating whether the contributions of the user were accurate or helpful. Similarly, other users may rate the contributions of the user as indicating that the user is a "trusted contributor for malware information", or other rating of expertise.

Put another way, a performance objective may comprise a measurement of a number of security cases closed by a user in a defined period of time. Comparing the user behavior against the performance objective may comprise determining if the user has closed a predetermined number of security cases in the defined period of time. For instance, a threshold may be established, indicating that in order to achieve a particular performance objective, the user must close 30 cases within 2 months. If the user has closed at least 30 cases within 2 months, then the performance objective is achieved.

As described herein, a performance objective may also comprise a measurement of a number of security cases closed by a group to which a user belongs within a defined period of time, and comparing the user behavior may comprise determining if the group has closed a predetermined number of security cases in that defined period of time. For instance, the performance objective may be for an organization, such as an information technology (IT) company to identify 50 malware cases in a 6 month period of time. Comparing the user behavior may comprise determining if the IT company has identified 50 malware cases in that 6 month period of time. In another example, the group may be a cohort of users across different organizations. The cohort may choose to collaborate, via the security information sharing platform, and the cohort may achieve a performance objective when, collectively, they identified 100 malware cases in a year. Examples are not so limited and individual users and/or a plurality of users within the security information sharing platform may be compared in a number of ways to measure performance, and collaboration within the security information sharing platform, in order to assign badges.

In another example, comparing the user behavior against a plurality of performance objectives may include comparing performance metrics of the user against performance metrics of the plurality of users in the security information sharing platform during a defined period of time. For example, the activity of each of the plurality of users may be measured during a period of time, such as 6 months, and the activity of each user during that period of time may be compared. For instance, during the 6 month period of time, a first user may identify 41 malware cases, a second user may identify 25 malware cases, and a third user may identify 6 malware cases. In this instance, the metric may be the number of malware cases identified by the particular user. The user with the greatest number of identified malware cases, e.g., the first user, may be assigned a badge. Similarly, a threshold number of identified malware cases may be established, such as 20 malware cases, and each user that met or exceed the threshold, e.g., the first and second user, would be assigned the badge.

In some examples, the user activity, e.g., user metrics, may be compared against an industry sector within the security information sharing platform. For example, each user within the financial sector may be compared against every other user within the financial sector. From that comparison, the user with the greatest number of positive peer ratings may be identified, and/or the user that found the greatest number of malware issues may be identified. In yet another example, the user within the financial sector that identified, and shared within the security information sharing platform, the security issue with the greatest impact to the financial sector, as determined by the users in the financial sector, may be assigned a badge. While the financial sector is provided herein as an example industry sector, examples are not so limited and any sector of commerce that collaborates in the security information sharing platform may participate.

In block 323, method 300 may include assigning a badge to a user among the plurality of users, for achievement of a performance objective among the plurality of performance objectives, based on the comparison. Referring back to FIG. 1, assignment engine 122 may be responsible for implementing block 323.

The foregoing disclosure describes a number of example embodiments of performance tracking in a security information sharing platform. The disclosed examples may include systems, devices, computer-readable storage media, and methods for management of performance tracking in a security information sharing platform. For purposes of explanation, certain examples are described with references to the components illustrated in FIGS. 1-3. The functionality of the illustrated components may overlap, however, and me be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-3 are examples and are not intended to be limiting. Additional or fewer operations or combinations of operations may be used or may vary without departing form the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included with in the scope of the disclosure and protected by the following claims.

What is claimed:

1. A method comprising:
monitoring, in a security information sharing platform that enables sharing of security information among a plurality of users, user behavior in the security information sharing platform;
comparing the user behavior against a plurality of performance objectives associated with contribution of security information in the security information sharing platform;
assigning a badge to a user among the plurality of users, for achievement of a performance objective among the plurality of performance objectives, based on the comparison, wherein the performance objective comprises a measurement of a number of security cases closed in a defined period of time; and
tagging contributions in the security information sharing platform from the user with the assigned badge.

2. The method of claim 1, wherein comparing the user behavior against the plurality of performance objectives includes one of:
determining that the user behavior exceeds a threshold associated with the performance objective; or measuring feedback from a plurality of other users in the security information sharing platform.

3. The method of claim 1, further comprising adding the assigned badge to a user profile for the user in the security information sharing platform.

4. The method of claim 1, further comprising:
marking an anonymous contribution to the security information sharing platform by the user with the assigned badge.

5. The method of claim 1, wherein the performance objective comprises the measurement of the number of security cases closed by the user in the defined period of time, and wherein comparing the user behavior against the performance objective comprises determining if the user has closed a predetermined number of security cases in the defined period of time.

6. The method of claim 1, wherein the performance objective comprises the measurement of the number of security cases closed by a group to which the user belongs within the defined period of time, and wherein comparing the user behavior against the performance objective comprises determining if the group has closed a predetermined number of security cases in the defined period of time.

7. The method of claim 1, wherein comparing the user behavior against a plurality of performance objectives includes:
measuring activity of each of the plurality of users during a defined period of time; and
comparing the measured activity of each of the plurality of users against a threshold established by the security information sharing platform.

8. The method of claim 1, comprising:
presenting the contributions from the user anonymously to other users with the assigned badge.

9. The method of claim 1, wherein the performance objective is associated with a first security indicator type from a plurality of security indicator types, and wherein each of the contributions tagged with the assigned badge are associated with the first security indicator type.

10. A non-transitory machine-readable medium comprising instructions executable by a processor to cause the processor to:
monitor user behavior in a security information sharing platform that enables sharing of security information among a plurality of users;
measure security related outcomes in the security information sharing platform by comparing the user behavior against a plurality of performance objectives associated with contribution of security information;
assign a badge to a user among the plurality of users in response to determining that the user achieved a particular security related outcome, wherein the particular security related outcome is based on a measurement of a number of security cases closed in a defined period of time; and
tag contributions in the security information sharing platform from the user with the assigned badge.

11. The medium of claim 10, further including instructions to:
combine a set of badges awarded to the user; and
generate a certificate for the user including the combined set of badges, wherein the certificate identifies a level of achievement of the user in addressing security events in the security information sharing platform.

12. The medium of claim 10, further including instructions to:
assign a badge to a cohort of the plurality of users in response to determining that the cohort achieved a particular security related outcome.

13. The medium of claim 10, further including instructions to:
present the contributions from the user anonymously to other users with the assigned badge.

14. The medium of claim 10, wherein the particular security related outcome is associated with a first security indicator type from a plurality of security indicator types, and wherein each of the contributions tagged with the assigned badge are associated with the first security indicator type.

15. A system comprising:
a hardware processor that executes machine-readable instructions that cause the system to:
monitor anonymous user indicators in a security information sharing platform that enables sharing of security information among a plurality of users;
compare the anonymous user indicators against a plurality of performance objectives associated with contribution of security information in the security information sharing platform;
assign a badge to a user among the plurality of users, for achievement by the user of a performance objective among the plurality of performance objectives, wherein the performance objective comprises a measurement of a number of security cases closed in a defined period of time; and
tag contributions in the security information sharing platform from the user with the assigned badge.

16. The system of claim 15, wherein the hardware processor executes machine-readable instructions that causes the system to:
tag subsequent anonymous indicators shared by the user in the security information sharing platform, with the assigned badge.

17. The system of claim 15, wherein the hardware processor executes machine-readable instructions that causes the system to assign the badge to the user in response to the user sharing information about an identified malware issue in the security information sharing platform.

18. The system of claim 15, wherein the hardware processor executes machine-readable instructions that cause the system to:
maintain a user profile for each respective user among the plurality of users; and
add the assigned badge to a user profile associated with the user.

19. The system of claim 15, wherein the hardware processor executes machine-readable instructions that cause the system to:
maintain a profile for each respective user among the plurality of users;
identify an organization to which the user belongs; and
assign the badge to each user within the organization.

20. The system of claim 15, wherein the hardware processor executes machine-readable instructions that cause the system to:
present the contributions from the user anonymously to other users with the assigned badge.

* * * * *